(12) United States Patent
Negishi et al.

(10) Patent No.: US 7,508,746 B2
(45) Date of Patent: Mar. 24, 2009

(54) OPTICAL PICKUP DEVICE

(75) Inventors: Hiroyuki Negishi, Ora-gun (JP); Sadao Iizuka, Ora-gun (JP); Minoru Sato, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 749 days.

(21) Appl. No.: 11/215,171

(22) Filed: Aug. 30, 2005

(65) Prior Publication Data

US 2006/0062101 A1 Mar. 23, 2006

(30) Foreign Application Priority Data

Aug. 31, 2004 (JP) ............................. 2004-252208
Jun. 13, 2005 (JP) ............................. 2005-172014

(51) Int. Cl.
*G11B 7/00* (2006.01)
(52) U.S. Cl. ................................ 369/112.29; 369/44.23
(58) Field of Classification Search ............ 369/112.01, 369/112.1, 112.29, 44.23, 44.24, 120, 121
See application file for complete search history.

(56) References Cited

U.S. PATENT DOCUMENTS 6,798,727 B2 * 9/2004 Motegi et al. .......... 369/112.29

FOREIGN PATENT DOCUMENTS

| JP | 9063096 | 3/1997 |
|----|---------|--------|
| JP | 9097444 | 4/1997 |
| JP | 9147401 | 6/1997 |

\* cited by examiner

*Primary Examiner*—Nabil Z Hindi
(74) *Attorney, Agent, or Firm*—Pillsbury Winthrop Shaw Pittman LLP

(57) ABSTRACT

An optical pickup device comprises a light emitting element which emits laser light, a photodetector which monitors a state of the laser light emitted from the light emitting element and applies feedback to a control of the light emitting element, and a reflect mirror which allows a portion of the laser light emitted from the light emitting element to be irradiated to the photodetector, wherein a rough surface portion is provided on a surface of the reflect mirror to avoid an erroneous operation of the optical pickup device.

8 Claims, 6 Drawing Sheets

OPTICAL PICKUP DEVICE

CROSS-REFERENCE TO RELATED APPLICATIONS

The entire disclosure of Japanese Patent Applications Nos. 2004-252208 and 2005-172014 including their specifications, claims, drawings, and abstracts is incorporated herein by reference.

BACKGROUND OF THE INVENTION

1. Field of the Invention

The present invention relates to an optical pickup device which can execute a process of recording in a high quality on a media such as a CD-R (Compact Disc-Recordable).

2. Description of the Related Art

FIG. 5 is an explanatory diagram showing one form of an optical pickup device in a related art. FIG. 6 is an explanatory diagram showing a state in which an interference of light has occurred due to an internal reflection of light within a reflect mirror within the exemplified structure.

An optical pickup device 501 (FIG. 5) is used to record or replay data such as information to or from a media 900. Examples of the media 900 include, for example, read-only optical disks such as a CD-ROM and a DVD-ROM and write-once optical disks such as a CD-R and DVD±R.

The term "CD" is an abbreviation for a "Compact Disc", "DVD" is an abbreviation for "Digital Versatile Disc" or "Digital Video Disc", and "ROM" as used in "CD-ROM" and "DVD-ROM" is an abbreviation for "Read Only Memory". With a CD-ROM or DVD-ROM, data can only be read, but data can be written to the CD-R or DVD±R, where the "R" stands for "Recordable".

The optical pickup device 501 replays data recorded on various optical disks or records data on various recordable or rewritable optical disks. The optical pickup device 501 corresponds to a CD-based media and a DVD-based media.

An electrical current is supplied from a laser driver 510 for CD to a light emitting element 520 for CD and laser light is output from the light emitting element 520 for CD. As the light emitting element 520 for CD, a laser diode (LD) is used. The LD 520 for CD is stored within a laser holder 530. The laser holder (LD holder) stores the LD.

Information is recorded on a disk 900 such as the CD-R or information recorded on the disk 900 such as the CD-R is replayed using the laser light which is emitted from the LD 520 when an electrical current is supplied from a laser driver (LDD) 510 to the LD 520.

The laser light emitted from the LD 520 transmits through a ½ wave retardation plate (HWP)-plus-diffraction grating 540 and a divergent lens 550, is reflected at an approximate right angle in and transmits through a first beam splitter 560, transmits through a second beam splitter 660, is reflected by a reflect mirror (RM) 800 at an approximate right angle, transmits through a collimator lens (CL) 710, a ¼ wave retardation plate (QWP) 720, and an objective lens (OBL) 730, and is irradiated onto the disk 900.

In the HWP-plus-diffraction grating 540, an HWP and a diffraction grating are combined as one structure. The diffraction grating splits laser light emitted from the LD into a plurality of components using diffraction of light. More specifically, the diffraction grating functions to separate the laser light emitted from the LD into one main beam and two sub-beams taking advantage of diffraction of light. The HWP has a function to change, with regard to the polarization characteristic of the laser light, a direction of polarization of linear polarization of laser light. The HWP is also called a ½λ (lambda) plate. The HWP-plus-diffraction grating has the characteristics of the HWP and the diffraction grating.

The divergent lens 550 focuses laser light emitted from the LD 520.

The beam splitter (BS) 560 shown in FIG. 5 reflects, with regard to the polarization direction of the laser light, an S wave and allows a P wave to transmit. A term "P" in "P wave" is an abbreviation of "parallel" in German and means "parallel". A term "S" in "S wave" is an abbreviation of the German word "senkrecht" meaning "vertical". The BSs 560 and 660 have different characteristics depending on the wavelength for CD and the wavelength for DVD.

Most of the laser light is reflected by the RM 800, but a portion of the laser light is transmitted. In the RM 800, a surface 801 from which the laser light enters is made into a coated smooth surface. In addition, a surface 802 in the RM 800 from which the laser light exits is also made into a coated smooth surface.

A CL 710 indicated by a solid line converts light entering the lens 710 from the side of the RM 800 into specular light and emits the specular light to the side of the OBL 730. Specular light is light in which the light beam does not widen but is transmitted in parallel. Diffuse light, on the other hand, refers to light from a light source which irradiates light in a manner such that the light diffuses in various directions.

The QWP 720 converts linearly polarized light into circularly polarized light or circularly polarized light into linearly polarized light.

The OBL 730 has a function to focus laser light emitted from the LD 520 or LD 620 on the disk 900. The OBL 730 is equipped on a lens holder (not shown).

A portion of the laser light output from the LD 520 transmits through the HWP-plus-diffraction grating 540 and the divergent lens 550, is reflected at an approximate right angle in and transmits through the first BS 560, transmits through the second BS 660 and the RM 800, and is incident on a photodetector 740. The photodetector 740 is formed as a front monitor diode (FMD) 740 onto which a portion of the laser light is irradiated. The FMD is a photodetector which monitors the laser light output from the LD and applies a feedback for control of the LD.

A portion of the laser light reflected by the disk 900 transmits through the OBL 730, QWP 720, and CL 710, is reflected at an approximate right angle in the RM 800, transmits through the second BS 660, the first BS 560, and an anamorphic lens 750, and is incident on a photo diode IC (PDIC) 760.

The anamorphic lens 750 creates an astigmatism of laser light. The astigmatism means a defocus.

The PDIC 760 is a photodetector which receives laser light reflected by the disk 900, converts the received laser light into an electrical signal, and detects information recorded on the disk 900. The PDIC 760 is also a photodetector which receives laser light reflected by the disk 900, converts the received light into an electrical signal, and operates a servo mechanism (not shown) of a lens holder (not shown) with OBL 730 which is a part of the optical pickup device 501. A servo mechanism is a mechanism which measures a state of a target of control, compares the measured state with a reference value, and automatically applies a correction control.

An electrical current is supplied from a laser driver 610 for DVD to a light emitting element 620 for DVD and laser light is output from the light emitting element 620 for DVD. The LD 620 for DVD is stored in a laser holder 630. Information is recorded on the disk 900 such as a DVD-R or information recorded on the disk 900 such as a DVD-R is replayed using the laser light emitted from the LD 620 when the electrical current is supplied from the LDD 610 to the LD 620.

The laser light output from the LD 620 transmits through a divergent lens 640 and a HWP-plus-diffraction grating 650, is reflected at an approximate right angle in and transmits through the BS 660, is reflected by the RM 800 at an approximate right angle, transmits through the CL 710, QWP 720, and OBL 730, and is irradiated onto the disk 900. The HWP-plus-diffraction grating 650 is a structure in which an HWP and a diffraction grating are combined.

A portion of the laser light output from the LD 620 transmits through a divergent lens 640 and the HWP-plus-diffraction grating 650, is reflected at an approximate right angle in and transmits through the BS 660, transmits through the RM 800, and is incident on the photodetector 740.

A portion of the laser light reflected by the disk 900 transmits through the OBL 730, QWP 720, and CL 710, is reflected at an approximate right angle in the RM 800, transmits through the second BS 660, first BS 560, and anamorphic lens 750, and is incident on the PDIC 760.

The LDD 510, LD 520, LDD 610, LD 620, FMD 740, and PDIC 760 are connected to a flexible substrate 505 such as a flexible printed circuit (FPC) in an electrically conductive manner. In the FPC 505, a plurality of circuit conductors 505$p$ are printed on an insulating sheet 505$q$, metal foils 505$p$ such as, for example, copper foils are provided on the insulating sheet 505$q$ in parallel, and a protection layer which is transparent or semitransparent (not shown) is provided on the metal foils.

In addition, there also exist a low-cost optical pickup device and an optical pickup device for a phase-change optical disk in which a semiconductor laser of a lower power can be used by forming a hologram in a shape of stairs to improve the diffraction efficiency of the light by each hologram.

In recent years, there has been a demand for further reduction in thickness and size of the optical pickup device 501 (FIG. 5). In order to reduce the thickness of the optical pickup device 501, a configuration has been considered in which the CL 710 and the QWP 720 shown by a solid line and positioned between the RM 800 and the OBL 730 are moved to a position between the second BS 660 and the RM 800 as a CL 710X and QWP 720X shown by a virtual line.

However, in the optical pickup device 501 having such a configuration, as shown in FIG. 6, an internal reflection of light occurs in an inside 804 of the RM 800 and, as a result, an interference of light occurs. The laser light transmitting from the second BS 660 (FIG. 5) through the CL 710X to the QWP 720X becomes specular light. When the laser light becomes specular light, an internal reflection occurs in the inside 804 of the RM 800 (FIG. 6) and interference of light results.

Here, interference of light refers to a phenomenon in which waves of light are superposed to result in intensified or weakened light. The interference of light does not occur in the optical pickup device 501 (FIG. 5) when the laser light is diffuse light and only occurs when the laser light is specular light.

When interference of light occurs due to internal reflection of light in the inside 804 of the RM 800 (FIGS. 5 and 6), the laser light irradiated onto the FMD 740 (FIG. 5) becomes unstable. In such a situation, the electrical current output from the FMD 740 fluctuates.

Because the FMD 740 monitors a portion of light transmitting through the RM 800, when interference of light occurs due to occurrence of the internal reflection of light in the RM 800 (FIG. 6), the amount of light transmitting through the RM 800 changes.

Consequently, the amount of light incident on the FMD 740 (FIG. 5) fluctuates, such that the amount of current supplied from the FMD 740 also fluctuates. When the amount of current supplied from the FMD 740 fluctuates, the power of the laser light emitted from the LD 520 or LD 620 also fluctuates.

Because the FMD 740 monitors the laser light output from the LD 520 or LD 620 and applies feedback for controlling the LD 520 or LD 620, when the amount of current supplied from the FMD 740 fluctuates, the power of the laser light emitted from the LD 520 or LD 620 also fluctuates.

There is a concern that, as a result of the above-described phenomenon, problems may result when data is written to the disk 900 such as CD-R or data is replayed from the disk 900 such as CD-R.

For example, when the intensity of laser light emitted from the LD 520 or LD 620 becomes unstable while data is being written to the optical disk 900 and a recording deficiency occurs on the optical disk 900, there may be cases that the recorded content on the optical disk 900 cannot be read using various optical disk devices (not shown). When the reading of media such as the optical disk 900 cannot be performed because of a recording deficiency on the media such as the optical disk 900, the optical disk 900 is wasted.

SUMMARY OF THE INVENTION

According to one aspect of the present invention, there is provided an optical pickup device comprising a light emitting element which emits laser light, a photodetector which monitors a state of the laser light emitted from the light emitting element and applies a feedback to a control of the light emitting element, and a reflect mirror which allows a portion of the laser light emitted from the light emitting element to be irradiated onto the photodetector, wherein a rough surface portion for preventing an erroneous operation of the photodetector due to internal reflection of light within the reflect mirror is provided on a surface of the reflect mirror.

BRIEF DESCRIPTION OF THE DRAWINGS

Preferred embodiments of the present invention will be described in detail based on the following drawings, wherein.

DESCRIPTION OF PREFERRED EMBODIMENTS

Figure 1:
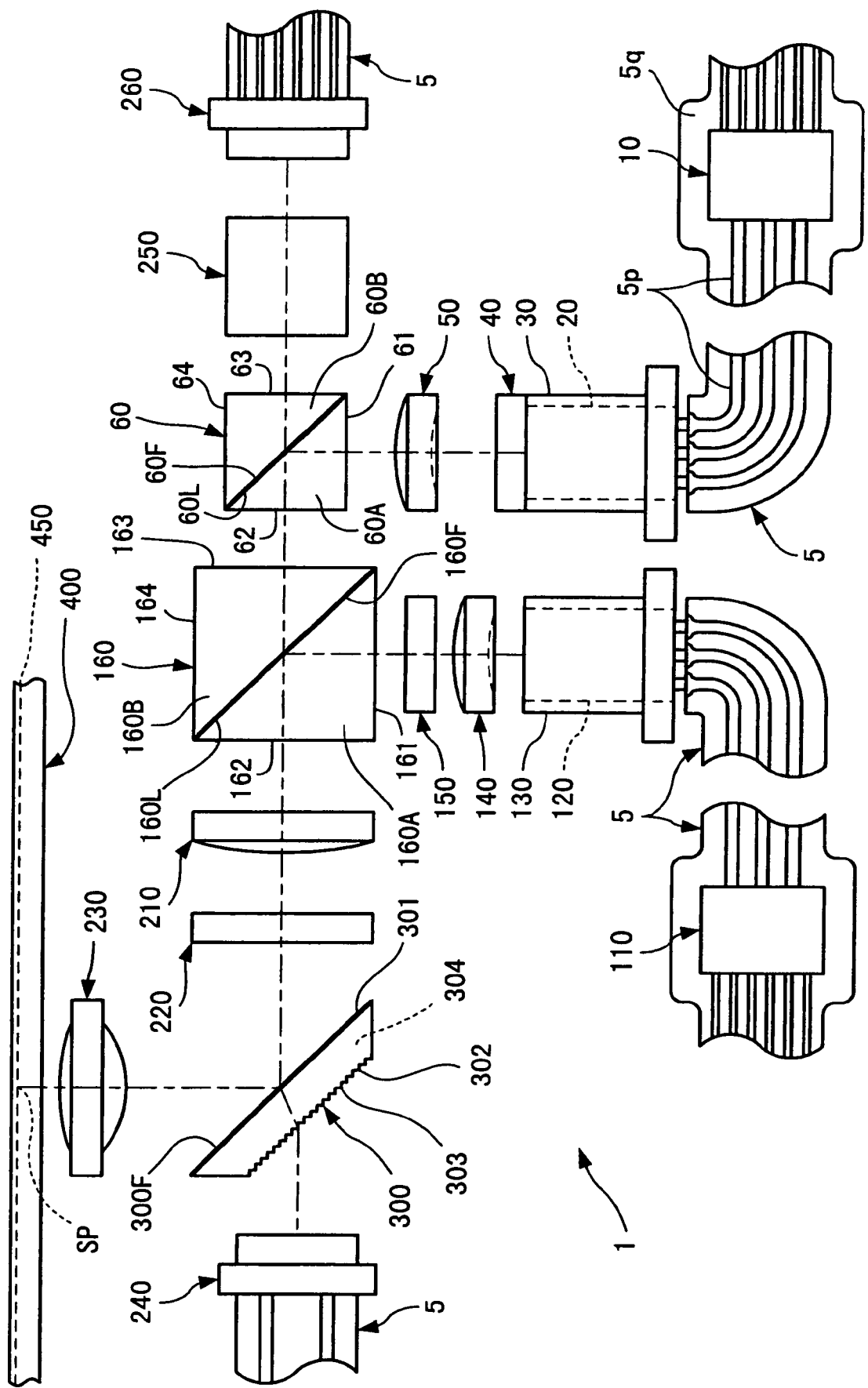
FIG. 1 is an explanatory diagram showing an optical pickup device according to a first preferred embodiment of the present invention.

Preferred embodiments of an optical pickup device according to the present invention will now be described in detail referring to the drawings.

First Preferred Embodiment

Figure 2:
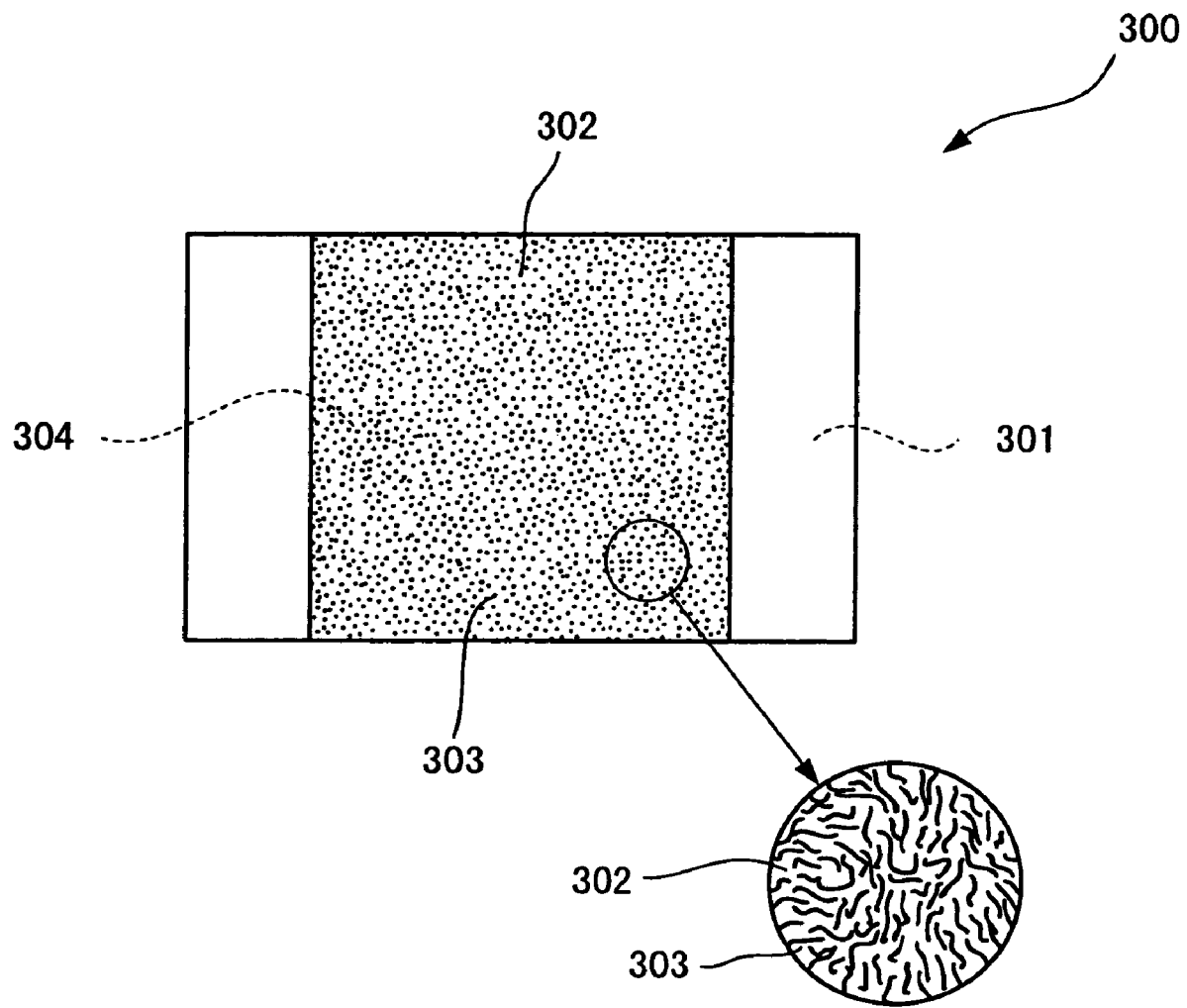
FIG. 2 is an explanatory view and a partial enlarged view showing a surface state of a reflect mirror.
Figure 3:
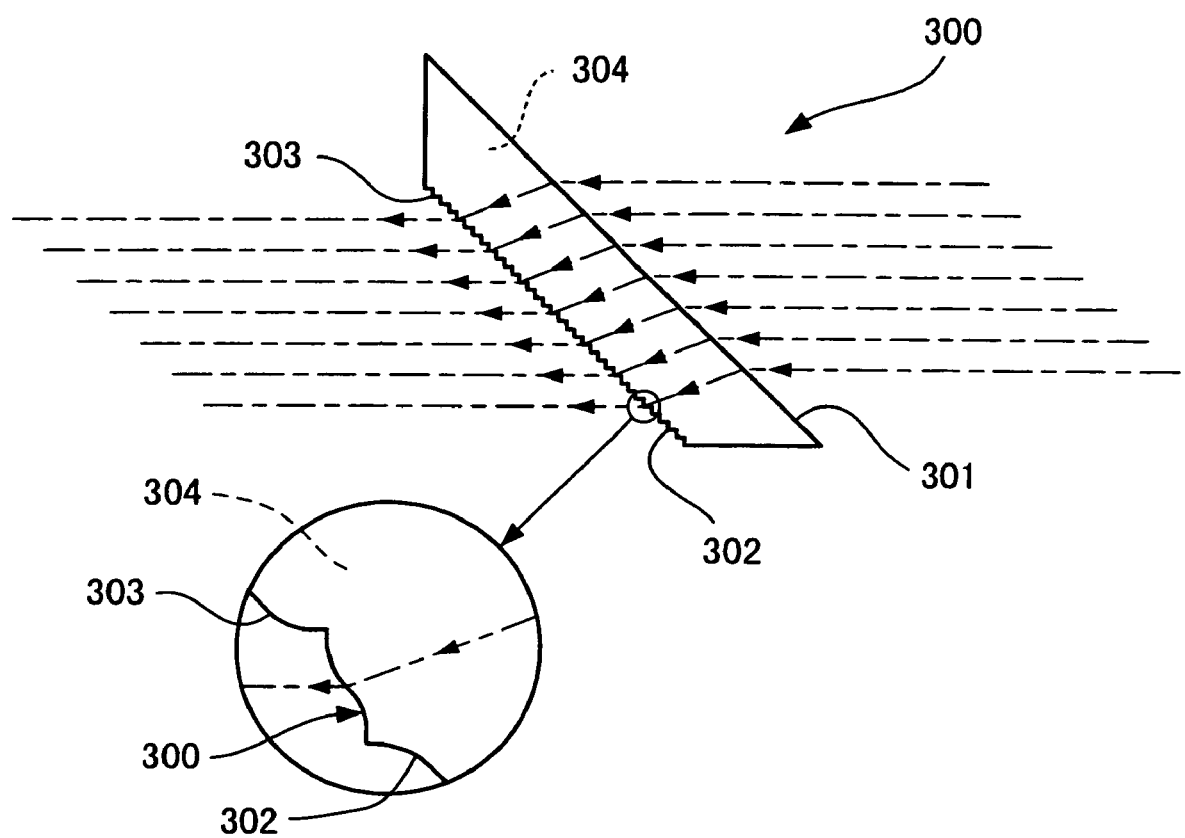
FIG. 3 is an explanatory diagram showing a state in which the laser light is transmitted through the reflect mirror.

FIG. 1 is an explanatory diagram showing an optical pickup device according to a first preferred embodiment of the present invention. FIG. 2 shows an explanatory view and a partial exploded view showing a surface state of a reflect mirror. FIG. 3 is an explanatory diagram showing a state in which laser light is transmitted through the reflect mirror.

Data such as information is replayed from or written to a media 400 using an optical pickup device 1 (FIG. 1). Examples of the media 400 include, for example, read-only optical disks such as a CD-ROM and a DVD-ROM, write-once optical disks such as a CD-R, a DVD-R, and a DVD+R, and writable/erasable/rewritable optical disks such as a CD-RW, DVD-RW, DVD+RW, DVD-RAM, HD DVD, or Blu-ray Disc.

The "RW" in the terms "CD-RW" and "DVD±RW" is an abbreviation for "ReWritable". Data can be rewritten in CD-RW and DVD±RW. The term "DVD-RAM" is an abbreviation for "Digital Versatile Disc Random Access Memory". Data can be read, written, and erased in DVD-RAM.

The term "HD DVD" is an abbreviation for "High Definition DVD". The "HD DVD" is compatible with the conventional DVD-based system and has a larger storage capacity than that of the conventional DVD-based optical disk. Infrared laser has been used for reading/writing a signal or data in conventional CD and red laser has been used for reading/writing a signal or data in conventional DVD. When data written to the optical disk of "HD DVD", on the other hand, violet laser is used. The term "Blu-ray" refers to a violet laser which is employed for realizing a high density recording, as opposed to the infrared laser used in reading/writing of a signal in the conventional CD and the red laser used in reading/writing of a signal in the conventional DVD.

As the optical disk, it is also possible to use, for example, an optical disk (not shown) in which a signal surface (not shown) is provided on both surfaces of the disk and data can be written, erased, or rewritten. In addition, it is also possible to employ, as the optical disk, an optical disk (not shown) in which a two-layer, three-layer, or four-layer signal surface (not shown) is provided and data can be written, erased, or rewritten.

The optical pickup device 1 replays data recorded on various optical disks or record data on various recordable and rewritable optical disks. The optical pick up device 1 corresponds to a plurality of media, including CD-based and DVD-based media.

An electrical current is supplied from a laser driver (LDD) 10 for CD to a light emitting element 20 for CD and laser light is output from the light emitting element 20 for CD. The light emitting element 20 for CD is formed as a laser diode for CD which emits laser light having a wavelength of approximately 770 nm~805 nm (nanometers). The LD 20 for CD is stored in a laser holder 30.

The first LDD 10 is a laser driver circuit which drives the first LD 20 to emit laser light. Information is written to or read from a disk 400 such as a CD-R using laser light emitted from the first LD 20 when the electrical current is supplied from the first LDD 10 to the first LD 20.

The laser light output from the first LD 20 transmits through a first ½ wave retardation plate (HWP)-plus-diffraction grating 40 and a first divergent lens 50, is reflected at an approximate right angle in and transmits through a first polarized beam splitter (PBS) 60, transmits through a second PBS 160, a collimator lens (CL) 210, and ¼ wave retardation plate (QWP) 220, is reflected at an approximate right angle in a reflect mirror (RM) 300, transmits through an objective lens (OBL) 230, and is irradiated onto a disk 400. The laser light incident on and reflected from a front side surface 301 of the RM 300 is focused onto the disk 400 by the OBL 230.

The side of the RM 300 near the LDs 20 and 120 or near the OBL 230 is defined as a "front surface side" of the RM 300. A side of the RM 300 near a photodetector 240 is defined as a "back surface side" of the RM 300. The definition of the "front" and "back" sides of the RM in this specification is only for convenience for explaining the pickup device having the RM.

The HWP-plus-diffraction grating (diffractive optical element; DOE) 40 is an element in which an HWP and a diffraction grating are combined. The DOE refers to a diffraction optical element which changes direction of propagation of light taking advantage of diffraction phenomenon of light.

The divergent lens 50 focuses laser light emitted from the LD 20. The divergent lens may also be referred to and handled as a "coupling lens", a "sensor lens", and an "intermediate lens".

The PBS 60, for example, reflects, with regard to the polarization direction of the laser light, the S wave and allows the P wave to transmit. The PBS 160, for example, reflects the S wave of laser light for DVD and allows the P wave of laser light for DVD to transmit. When the laser light for CD enters the PBS 160, both the S wave and the P wave of the laser light for CD, for example, transmit through. The S wave and the P wave are appropriately used based on the design specification of the optical pickup device or the like. The PBS's 60 and 160 have difference characteristics depending on the wavelength for CD and wavelength for DVD.

For example, with the PBS 160 being precisely attached to the housing, generation of astigmatism in laser light irradiated onto the disk 400 is inhibited. The "astigmatism" refers to, for example, defocus. A "housing" refers to a box or a box-like object to which an object can be held such as a box-shaped object to which a component is stored.

The first PBS 60 comprises a first member 60A having an approximate triangle pole shape and a second member 60B having an approximate triangle pole shape that matches the first member 60A. The first PBS 60 having an approximate cubic shape is formed by matching the first member 60A having an approximate triangle pole shape and the second member 60B having an approximate triangle pole shape. A film 60F is provided between the first member 60A which is a part of the first PBS 60 and the second member 60B which is a part of the first PBS 60. The film 60F is formed on a boundary portion 60L within the first PBS 60. Surfaces 61, 62, 63, and 64, each of which is a part of the first PBS 60, are formed as coated smooth surfaces 61, 62, 63, and 64.

A second side surface 62 of the first PBS 60 formed in an approximately cubic shape is formed as a surface which intersects a first side surface 61 of the first PBS 60 at a right angle. A third side surface 63 of the first PBS 60 is formed as a surface parallel to the second side surface 62 of the first PBS 60. The third side surface 63 of the first PBS 60 intersects the first side surface 61 of the first PBS 60 at a right angle. A fourth side surface 64 of the first PBS 60 is formed as a surface parallel to the first side surface 61 of the first PBS 60. The two remaining side surfaces, that is, those other than the first side surface 61, second side surface 62, third side surface 63, and fourth side surface 64, will not be described here in detail because these side surfaces are unrelated to the optical path of the laser light. Examples of a PBS 60 having the film 60F inside include, for example, a PBS prism manufactured by Tamron Co., Ltd.

The second PBS 160 comprises a first member 160A having an approximately triangular pole shape and a second member 160B having an approximately triangular pole shape which matches the first member 160A. The second PBS 160 having an approximately cubic shape is formed by matching the first member 160A having an approximately triangular pole shape and the second member 160B having an approximately triangular pole shape. A special film 160F is provided between the first member 160A which is a part of the second PBS 160 and the second member 160B which is a part of the second PBS 160. The special film 160F is formed on a boundary portion 160L in the second PBS 160. The film 160F is a special film 160F which allows transmission of laser light for CD having a wavelength of approximately 770 nm~805 nm. Because the special film 160F is provided on the boundary portion 160L in the second PBS 160, the second PBS 160 have different characteristics with respect to the wavelength for CD and the wavelength for DVD. The second PBS 160 is also referred to as a "dichroic prism". The film provided in the dichroic prism is also referred to as "dichroic film". The term "dichroic" means that there are two color phases. Surfaces 161, 162, 163, and 164 each of which is a part of the second PBS 160 are formed as coated smooth surfaces 161, 162, 163, and 164.

A second side surface 162 of the second PBS 160 which is formed in an approximately cubic shape is formed as a surface intersecting a first side surface 161 at a right angle. A third side surface 163 of the second PBS 160 is formed as a surface parallel to the second side surface 162 of the second PBS 160. The third side surface 163 of the second PBS 160 intersects the first side surface 161 of the second PBS 160 at a right angle. A fourth side surface 164 of the second PBS 160 is formed as a surface parallel to the first side surface 161 of the second PBS 160. Two remaining side surfaces of the second PBS 160 other than the first side surface 161, second side surface 162, third side surface 163, and fourth side surface 164 are unrelated to the optical path of the laser light and will not be described in detail. Examples of the PBS 160 having a dichroic film 160F inside include, for example, a PBS prism manufactured by Tamron Co. Ltd.

The CL 210 converts light incident on the lens 210 from a side near the LD 20 and LD 120, that is, a side near the PBS's 60 or 160 into specular light, which is output to a side near the QWP 220, that is, a side near the RM 300.

The QWP 220 converts linearly polarized light into circularly polarized light or circularly polarized light into linearly polarized light. The QWP 220 is necessary in an optical pickup device 1 for recording on a DVD. Because the linearly polarized light is converted to circularly polarized light so that the laser light between the QWP 220 and the disk 400 is circularly polarized light, even when the disk 400 is of poor quality, the recording/replaying operation of data to and from the disk 400 can be normally performed. In addition, because the linearly polarized light is converted to the circularly polarized light so that the laser light between the QWP 220 and the disk 400 is circularly polarized light, the characteristics during the writing/replaying of data to and from the CD-R disk 400 are improved. The QWP is also referred to as ¼λ plate. Some optical pickup devices (not shown) lack the QWP depending on the type and model of the optical pickup device.

When the laser light is irradiated from the side near the QWP 220, that is, the side near the LDs 20 and 120 to a front side surface 301 of the RM 300, most of the laser light is reflected, is transmitted through the OBL 230, and is irradiated onto the disk 400. A portion of the laser light, however, transmits through the inside 304 of the mirror and is irradiated onto the photodetector 240. When the laser light which is reflected by the disk 400 and transmitted through the OBL 230 is irradiated onto the front side surface 301 of the RM 300, most of the laser light is reflected to the side of the QWP 220, that is, the side of the CL 210. The RM 300 is formed using glass having a superior optical characteristic. The RM 300 is also referred to as the "initial mirror".

A special film 300F is provided on the front side surface 301 of the RM 300. The film 300F has a function to, for example, reflect most of the laser light and allow a portion of the laser light to transmit through. When laser light is irradiated onto the special film 300F, for example, approximately 92%~98% of the laser light is reflected and approximately 2%~8% of the laser light transmits through. Therefore, when laser light is irradiated onto the special film 300F on the front side surface 301 of the RM 300, approximately 95% of the laser light is reflected and approximately 5% of the laser light transmits through.

When the amount of reflection of laser light when the laser light is irradiated onto the front side surface 301 of the RM 300 is less than, for example, 92%, that is, when the amount of transmission is greater than, for example, 8%, the amount of laser light necessary to be irradiated onto the optical disk 400 becomes insufficient. When, on the other hand, the amount of reflection of the laser light when the laser light is irradiated onto the front side surface 301 of the RM 300 is, for example, greater than 98%, that is, when the amount of transmission of the laser light is less than, for example, 2%, the amount of laser light received is insufficient for the photodetector 240. When the amount of reflection of laser light when the laser light is irradiated onto the front side surface 301 of the RM 300 is set to, for example, 95%, that is, when the amount of transmission of the laser light is set to, for example, 5%, a sufficient amount of laser light is irradiated onto both the optical disk 400 and the photodetector 240. Therefore, it is desirable that the RM 300 having such a characteristic be equipped in the optical pickup device 1.

Because the special film 300F is provided on the front side surface 301 of the RM 300, when laser light is irradiated onto the front side surface 301 of the RM 300, most of the laser light is reflected and a portion of the laser light transmits through the inside 304 of the mirror. The front side surface 301 of the RM 300 on which the special film 300F is provided is formed as a smooth coated surface. Examples of the RM 300 in which the special film 300F is provided on the surface 301 include, for example, a mirror with film manufactured by Tamron Co., Ltd.

The OBL 230 has a function to focus the laser light emitted from the LD 20 or LD 120 onto the disk 400. The OBL 230 is equipped on a lens holder (not shown).

When a focus servo operation of the lens holder having the OBL 230 is performed with respect to the disk 400, the lens holder having the OBL 230 is moved along the vertical direction of FIG. 1. When, on the other hand, a tracking servo operation of the lens holder having the OBL 230 is performed with respect to the disk 400, the lens holder having the OBL 230 is moved along the horizontal direction of FIG. 1.

Here, the term "focus" refers to focusing and pointing, while the term "tracking" refers to a process for tracing and observing small pits (holes and depressions), grooves, or wobbles formed on the disk 400 using light to define a position of a trajectory drawn in a helical shape.

A portion of the laser light output from the first LD 20 transmits through a first DOE 40 and a first divergent lens 50, is reflected at an approximate right angle in and transmits through the first PBS 60, transmits through the second PBS 160, CL 210, and QWP 220, enters the inside 304 of the RM 300 through the front side surface 301 of the RM 300, exits from the back side surface 302 of the RM 300, and is irradiated onto the photodetector 240. A portion of the laser light emitted from the first LD 20 is detected by the photodetector 240 behind the RM 300.

The photodetector 240 is formed as a front monitor diode (FMD) to which a portion of the laser light is irradiated. The FMD is a photodetector which monitors the laser light output from the LD and applies a feedback for controlling the LD.

A portion of the laser light reflected by the disk 400 transmits through the OBL 230, is reflected at an approximate right angle by a front side surface 301 of the RM 300, transmits through the QWP 220, CL 210, second PBS 160, first PBS 60, and anamorphic lens 250, and is incident on the photo diode IC (PDIC) 260.

The anamorphic lens 250 creates astigmatism of laser light.

The PDIC 260 is a photodetector which receives laser light reflected by the disk 400, converts the received laser light into an electrical signal, and detects information recorded on the disk 400. The PDIC 260 is also a photodetector which receives laser light reflected by the disk 400, converts the signal into an electrical signal, and operates a servo mechanism (not shown) of the lens holder with OBL 230 (not shown) which is a part of the optical pickup device 1.

The laser light for CD output from the first LD 20 will now be explained in detail. When laser light for CD having a wavelength of approximately 770 nm~805 nm is emitted from the first LD 20 and transmits through the first DOE 40, the polarization direction of the linear polarization is changed and the light becomes, for example, S wave. The S wave transmits through the first divergent lens 50 and enters the first PBS 60.

Because the laser light for CD in this process is S wave, the laser light for CD which enters through the first side surface 61 of the first PBS 60 to the inside of the first PBS 60 is reflected at an approximate right angle by a sloped boundary portion 60L of the first PBS 60 and is transmitted to the outside from the second side surface 62 of the first PBS 60 which intersects the first side surface 61 at a right angle.

The S wave exiting from the second side surface 62 of the first PBS 60 enters the inside of the second PBS 160 from the third side surface 163 of the second PBS 160, propagates in a straight line within the second PBS 160, and exits from the second side surface 162 which is parallel to the third side surface 163 of the second PBS 160. Because the second PBS 160 has a film 160F which allows transmission of the laser light for CD having a wavelength of approximately 770 nm~805 nm, the S wave having a wavelength of approximately 770 nm~805 nm transmits in a straight line through the second PBS 160.

The linearly polarized S wave exiting from the second side surface 162 of the second PBS 160 becomes specular light when the light transmits through the CL 210. The linearly polarized light which is converted to the specular light is converted by the QWP 220 into, for example, circularly polarized light in a clockwise orientation. Most of the laser light for CD which is converted by the QWP 220 to the circularly polarized light in clockwise orientation is reflected at a front side surface 301 of the RM 300 at an approximate right angle, transmits through the OBL 230, and is irradiated to the CD-based disk 400.

A portion of the laser light for CD converted by the QWP 220 to the circularly polarized light in clockwise orientation enters the inside 304 of the RM 300 through the front side surface 301 of the RM 300, exits from the back side surface 302 of the RM 300, and is irradiated to the FMD 240.

When the laser light for CD is irradiated to the CD-based disk 400 and reflected from the CD-based disk 400, the laser light for CD which is the circularly polarized light in clockwise orientation becomes laser light for CD which is circularly polarized light in a counterclockwise orientation. When the laser light for CD is irradiated onto the CD-based disk 400 and is reflected from the CD-based disk 400, the orientation of the circular polarization is inverted.

The laser light for CD which is changed to the circularly polarized light in counterclockwise orientation transmits through the OBL 230 and is irradiated onto the front side surface 301 of the RM 300. Most of the laser light for CD which is changed to circular polarized light in counterclockwise orientation is reflected at the front side surface 301 of the RM 300 at an approximate right angle and enters the QWP 220.

When the circularly polarized light in counterclockwise orientation which entered the QWP 220 transmits through the QWP 220, the laser light is converted to linearly polarized P wave. The P wave transmits through the CL 210 and enters the second PBS 160.

The P wave enters through the second side surface 162 of the second PBS 160 to the inside of the second PBS 160 and exits from the third side surface 163 which is parallel to the second side surface 162 of the second PBS 160. The P wave having a wavelength of approximately 770 nm~805 nm transmits in a straight line in the second PBS 160 having the film 160F. Because a special film 160F which allows transmission of laser light for CD having a wavelength of approximately 770 nm~805 nm is used as the film 160F provided in the second PBS 160, the P wave having a wavelength of approximately 770 nm~805 nm transmits in a straight line through the second PBS 160.

The P wave having a wavelength of approximately 770 nm~805 nm exiting through the third side surface 163 of the second PBS 160 enters the inside of the first PBS 60 through the second side surface 62 of the first PBS 60 and exits from the third side surface 63 of the first PBS 60 which is parallel to the second side surface 62. Because the laser light for CD in this process is a P wave, the P wave transmits through the sloped boundary portion 60L within the first PBS 60 and transmits through the first PBS 60 in a straight line. Then, the P wave transmits through the anamorphic lens 250 and is irradiated onto the PDIC 260. Most of the laser light for CD output from the first LD 20 is incident on the PDIC 260 in this manner.

When an electrical current is supplied from the laser driver 110 for DVD to the light emitting element 120 for DVD, laser light is emitted from the light emitting element 120 for DVD. The light emitting element 120 for DVD is formed as a laser diode for DVD which emits laser light having a wavelength of approximately 630 nm~670 nm. The LD 120 for DVD is stored in the laser holder 130. The second LDD 110 is a laser driver circuit which drives the second LD 120 to emit laser light. Information is written to or replayed from a disk 400 such as a DVD-R using the laser light emitted from the second LD 120 when an electrical current is supplied from the second LDD 110 to the second LD 120.

The laser light output from the second LD 120 transmits through a second divergent lens 140 and a second HWP-plus-diffraction grating (DOE) 150, is reflected at an approximate right angle in and transmits through the second PBS 160, transmits through the CL 210 and QWP 220, is reflected at an approximate right angle by the RM 300, transmits through the OBL 230, and is irradiated onto the disk 400. The DOE 150 is an element in which an HWP and a diffraction grating are combined.

A portion of the laser light output from the second LD 120 transmits through the second divergent lens 140 and the second DOE 150, is reflected at an approximate right angle such it transmits through the second PBS 160, transmits through the CL 210 and QWP 220, enters the inside 304 of the RM 300 through the front side surface 301 of the RM 300, exits from the back side surface 302 of the RM 300, and is irradiated onto the FMD 240. A portion of the laser light emitted from the second LD 120 is detected by the FMD 240 behind the RM 300.

A portion of the laser light reflected by the disk 400 transmits through the OBL 230, is reflected at an approximate right angle at the front side surface 301 of the RM 300, transmits through the QWP 220, CL 210, second PBS 160, first PBS 60, and anamorphic lens 250, and is incident on the PDIC 260.

The laser light for DVD output from the second LD 120 will now be described in detail. The laser light for DVD having a wavelength of approximately 630 nm~670 nm emitted from the second LD 120 first transmits through the second divergent lens 140. The polarization direction of the linear polarization of the laser light having a wavelength of approximately 630 nm~670 nm transmitted through the second divergent lens 140 is changed during when the laser light transmits through the second DOE 150 so that the laser light becomes, for example, S wave.

The S wave enters the second PBS 160. In this process, because the laser light for DVD is the S wave, the laser light for DVD entering the second PBS 160 through the first side surface 161 of the second PBS 160 is reflected at an approximate right angle by the sloped boundary portion 160L within the second PBS 160 and exits through the second side surface 162 of the second PBS 160 which intersects the first side surface 161 at a right angle.

When the linearly polarized S wave exiting through the second side surface 162 of the second PBS 160 transmits through the CL 210, the linearly polarized S wave is changed to specular light. The linearly polarized light changed to the specular light is changed by the QWP 220, for example, into circularly polarized light in a clockwise orientation. Most of the laser light for DVD changed by the QWP 220 to the circularly polarized light in clockwise orientation is reflected by the front side surface 301 of the RM 300 at an approximate right angle, transmits through the OBL 230, and is irradiated to the DVD-based disk 400.

A portion of the laser light for DVD changed by the QWP 220 to the circularly polarized light in clockwise orientation enters the inside 304 of the RM 300 through the front side surface 301 of the RM 300, exists from the back side surface 302 of the RM 300, and is irradiated onto the FMD 240.

When the laser light for DVD is irradiated to the DVD-based disk 400 and is reflected by the DVD-based disk 400, the laser light for DVD which is circularly polarized light in a clockwise orientation is changed to laser light for DVD which is circularly polarized light in a counterclockwise orientation. When the laser light for DVD is irradiated to the DVD-based disk 400 and is reflected by the DVD-based disk 400, the orientation of the circular polarization is reversed.

The laser light for DVD which is changed to circularly polarized light in counterclockwise orientation transmits through the OBL 230 and is irradiated onto the front side surface 301 of the RM 300. Most of the laser light for DVD which is changed to the circularly polarized light in the counterclockwise orientation is reflected at an approximate right angle by the front side surface 301 of the RM 300 and enters the QWP 220.

When the circularly polarized light in the counterclockwise orientation entering the QWP 220 transmits through the QWP 220, the light is changed to linearly polarized P wave. The P wave transmits through the CL 210 and is incident on the second PBS 160.

The P wave enters the second PBS 160 through the second side surface 162 of the second PBS 160 and exits through the third side surface 163 of the second PBS 160 which is parallel to the second side surface 162. The P wave having a wavelength of approximately 630 nm~670 nm transmits in a straight line through the second PBS 160. Because the laser light for DVD in this process is the P wave, the P wave transmits through the sloped boundary portion 160L within the second PBS 160 and in a straight line through the second PBS 160.

The P wave having a wavelength of approximately 630 nm~670 nm exiting through the third side surface 163 of the second PBS 160 enters the first PBS 60 through the second side surface 62 of the first PBS 60 and exits from the third side surface 63 of the first PBS 60 which is parallel to the second side surface 62. Because the laser light for DVD in this process is P wave, the P wave transmits through the sloped boundary portion 60L within the first PBS 60 and transmits in a straight line through the first PBS 60. The P wave then transmits through the anamorphic lens 250 and is irradiated onto the PDIC 260. Most of the laser light for DVD output from the second LD 120 is incident to the PDIC 260 in this manner.

In this manner, the optical pickup device 1 is a polarization optical device in which the polarization characteristic is taken advantage of and transmission characteristic of light and the reflection characteristic of light are applied.

The first LDD 10, LD holder 30 having the first LD 20, first DOE 40, first divergent lens 50, first PBS 60, second LDD 110, LD holder 130 having the second LD 120, second divergent lens 140, second DOE 150, second PBS 160, CL 210, QWP 220, OBL 230, FMD 240, anamorphic lens 250, PDIC 260, and RM 300 are equipped in a housing (not shown). The RM 300 is fixed in the housing in a tilted state with respect to the QWP 220, OBL 230, and FMD 240.

The first LD 20, first DOE 40, first divergent lens 50, first PBS 60, second LD 120, second divergent lens 140, second DOE 150, second PBS 160, CL 210, QWP 220, OBL 230, FMD 240, anamorphic lens 250, PDIC 260, and RM 300 are optical components each forming a part of the optical pickup device 1.

The first LDD 10, first LD 20, second LDD 110, second LD 120, FMD 240, and PDIC 260 are connected to a flexible substrate 5 such as a flexible printed circuit (FPC) in an electrically conductive manner. The flexible substrate 5 is also equipped in the housing. In the FPC 5, a plurality of circuit conductors 5p are printed on an insulating sheet 5q, metal foils 5p such as, for example, copper foils are provided on the insulating sheet 5q in parallel, and a protection layer (not shown) which is transparent or semitransparent is formed on the metal foils 5p to form the FPC 5.

Various electric/electrical components such as the LDDs 10 and 110, LDs 20 and 120, FMD 240, and PDIC 260 are connected to the flexible substrate 5 in an electrically conductive manner through soldering.

The optical pickup device 1 is configured in this manner. Although not shown in FIG. 1, the optical pickup device 1 may also comprise elements (not shown) other than the elements shown in FIG. 1.

As shown in FIG. 1, the optical pickup device 1 comprises the LD 20 for CD which emits infrared laser light having a wavelength of approximately 770 nm~805 nm, the LD 120 for DVD which emits red laser light having a wavelength of approximately 630 nm~670 nm, the FMD 240 which monitors a state of the laser light emitted from the LD 20 or LD 120 and applies feedback to control of the LD 20 or LD 120, and RM 300 which reflects laser light emitted from the LD 20 or LD 120 toward the OBL 230 and allows a portion of the laser light emitted from the LD 20 or LD 120 to be transmitted through and irradiated onto the FMD 240.

Alternatively, it is also possible to use an LD (20) which emits laser light of, for example, violet color having a wavelength of approximately 390 nm~420 nm in place of the LD 20 for CD. In addition, it is also possible to use LD (120) which emits laser light of violet color having a wavelength of, for example, approximately 390 nm~420 nm in place of the LD 120 for DVD. Violet color laser light is used in Blu-ray disc-based media. For example, the optical pickup device can correspond to at least one type of media selected from among CD-based media, DVD-based media, and Blu-ray disc-based media.

A rough surface portion 303 (FIGS. 1~3) for preventing multiple interference pattern of light in the FMD 240 or the like due to occurrence of internal reflection of laser light at the inside 304 of the RM 300 is provided on the surface 302 of the RM 300. More specifically, fine depressions and projections 303 (FIG. 2) for preventing occurrence of multiple interference pattern of light at the FMD 240 due to occurrence of internal reflection of laser light at the inside 304 of the mirror is provided on the surface 302 of the RM 300. For convenience of explanation, an exaggerated rough surface portion 303 of the RM 300 shown in FIGS. 1~3, although in actual practice, the depressions and projections 303 formed on the surface 302 of the RM 300 are very fine.

Referring to FIG. 3, depressions and projections which allow light to transmit without being reflected inside 304 of the RM 300 are provided on the surface 302 of the RM 300. One surface 302 of the RM 300 is formed to have a roughness that allows light from the inside 304 of the mirror to be dispersed. The multiple interference of light refers to a phenomenon in which light waves are superposed and the intensity is intensified or weakened.

The RM 300 is formed as a glass body having a plate-like shape comprising the first surface 301 to which a portion of the laser light is incident, the second surface 302 which is formed parallel to the first surface 301 and from which a portion of the laser light transmitted from the first surface 301 through the inside 304 of the mirror exits, and a rough surface portion 303 having fine depressions and projections which is provided on the second surface 302 and which prevents occurrence of interference of light at the inside 304 of the mirror.

When the rough surface portion 303 having fine depressions and projections is provided on the surface 302 of the RM 300, it is possible to easily avoid an erroneous operation of the optical pickup device 1 due to an erroneous operation of the FMD 240 (FIG. 1) because of interference of light which occurs due to internal reflection of laser light at the inside 304 of the RM 300 (FIGS. 1~3).

Figure 5:
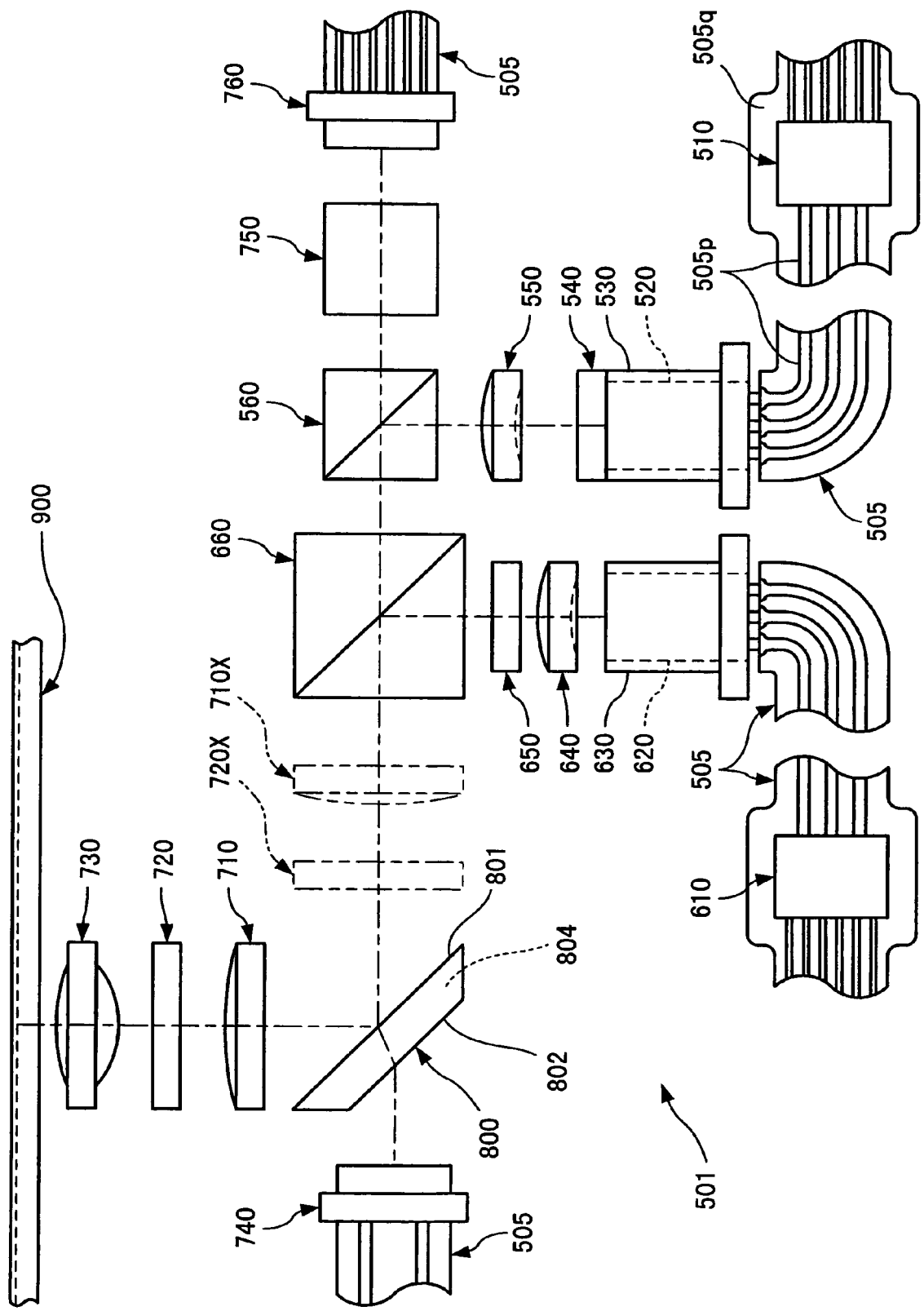
FIG. 5 is an explanatory diagram showing one form of an optical pickup device according to a related art.
Figure 6:
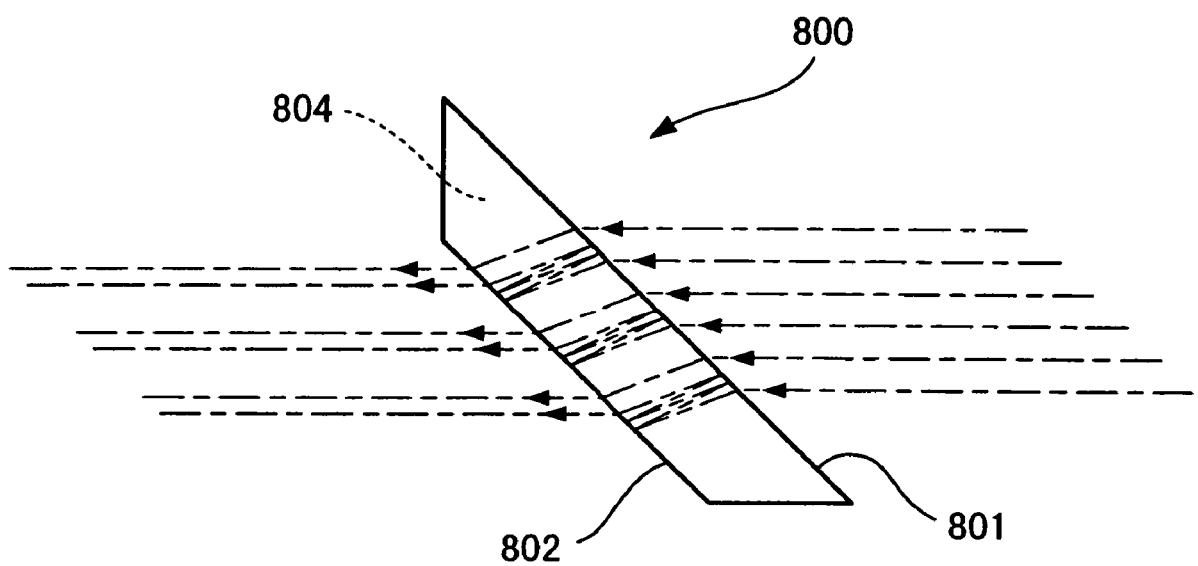
FIG. 6 is an explanatory diagram showing a state in which interference of light occurred due to internal reflection of light occurring within a reflect mirror in a related art.

In an optical pickup device (501) having an optical layout in which the CL 710 (FIG. 5) and the QWP 720 shown by a solid line are moved such that the CL 710 and the QWP 720 are placed as the CL 710X and QWP 720X shown by a virtual line between the second BS 660 and the RM 800, internal reflection of laser light occurs in the RM 800 (FIG. 6) which results in multiple interference pattern of light on the FMD 740, and erroneous operation of the optical pickup device (501) (FIG. 5).

However, even in such an optical layout, if the fine depressions and projections 303 for preventing occurrence of internal reflection of laser light at the inside 304 of the mirror are provided on the back side surface 302 of the RM 300 as in the optical pickup device 1 of FIG. 1, it is possible to facilitate avoiding erroneous operation of the optical pickup device 1 due to multiple interference pattern of light on the FMD 240.

When, for example, data such as information is written to various media 900 such as a CD-R using an optical pickup device 501, laser light which is specular light is incident on the RM 800. If internal reflection of laser light occurs within the RM 800 (FIG. 6) in this process, the laser light entering the FMD 740 (FIG. 5) changes. There has been a concern that, in such cases, the intensity of laser light emitted from the LD 520 or LD 620 can become unstable, laser light having a defined power is not emitted from the LD 520 or LD 620, and the quality of data recording to the media 900 such as the CD-R will, as a result, be reduced. For example, when the wavelength of laser emitted from the LD 520 or LD 620 is changed merely by 1 nm due to a change in surrounding temperature, the interference pattern of light on the FMD 740 changes and the operation of the FMD 740 becomes unstable.

When, however, a rough surface portion 303 having fine depressions and projections for preventing erroneous operation of the FMD 240 due to internal reflection of light in the inside 304 of the RM 300 (FIGS. 1~3) is provided on the surface 302 of the RM 300, a portion of the laser light transmitting through the RM 300 is incident on the FMD 240 (FIG. 1) at a stable state. Because the rough surface portion 303 having fine depressions and projections for preventing occurrence of multiple interference pattern of laser light on the FMD 240 or the like due to internal reflection of light in the inside 304 of the RM 300 is provided on the surface 302 of the RM 300, a portion of the laser light transmitting through the RM 300 is incident on the FMD 240 at a stable state.

With such a structure, the intensity of laser light emitted from the LD 20 or LD 120 is stabilized, laser light of a defined power is emitted from the LD 20 or LD 120, and data can be recorded on the media 400 such as CD-R with a high quality. Therefore, it is possible to provide an optical pickup device 1 in which high quality recording can be executed on various medias 400 such as the CD-R without a deficiency such as recording deficiency to optical disk device manufacturers of an, manufacturers of the optical pickup device 1, users of the optical pickup device 1, etc.

As shown in FIGS. 1~3, the RM 300 equipped in the optical pickup device 1 (FIG. 1) is formed in an approximate plate shape. The rough surface portion 303 having fine depressions and projections formed on the RM 300 is provided only on the back side surface 302 of the RM 300 which is the side near the FMD 240. The front side surface 301 of the RM 300 is formed as coated smooth surface 301.

When the rough surface portion 303 (FIG. 3) having fine depressions and projection is provided only on the back side surface 302 of the RM 300 which is the side near the FMD 240, the occurrence of interference of light due to internal reflection of laser light at the inside 304 of the RM 300 is avoided. In this manner, a portion of the laser light emitted from the LD 20 or LD 120 reliably transmits through the inside 304 of the RM 300 and is reliably incident on the FMD 240. Therefore, an erroneous operation of the optical pickup device due to fluctuation of power of laser light emitted from the LD 20 or LD 120 because of a portion of the laser light incident on the FMD 240 becoming unstable can be avoided.

When the laser light is irradiated from the OBL 230 (FIG. 1) to the disk 400, the spot SP of the laser light formed on a data recording portion 450 of the disk 400 is important. A spot refers to a state in which a point is brightly irradiated. Data is written to the disk 400 or data recorded on the disk 400 is replayed when the laser light emitted from the LD 20 or LD 120 is focused by the OBL 230. During this process, spot SP of the laser light having an optimum size and an optimum intensity is placed on fine pits (holes or depressions), grooves, wobbles, etc. formed on the disk 400. As described, it is important that the spot SP of the laser light formed through irradiation from the OBL 230 to the disk 400 be realized as an optimum spot SP.

In order to realize a high performance optical pickup device 1, it is necessary that the spot SP of the laser light formed through irradiation from the OBL 230 to the disk 400 be very precisely formed as an optimum spot SP. In order to realize such a high performance optical pickup device 1, it is necessary to stabilize the laser light emitted from the LD 20 or LD 120. In consideration of these circumstances, it is necessary that the front side surface 301 of the RM 300 be formed as a coated smooth surface 301 in order to form a high precision spot SP on the data recording portion 450 of the disk 400.

The portion of the laser light incident on the FMD 240, on the other hand, may be somewhat defocused as long as the internal reflection of the laser light does not occur within the RM 300 and the multiple interference pattern of light does not occur on the FMD 240 so that erroneous operation of the FMD 240 is avoided and FMD 240 normally operates. Therefore, as long as the rough surface portion 303 having fine depressions and projection is provided on the back side surface 302 of the RM 300, the optical pickup device 1 can normally functions.

As shown in FIG. 2, the rough surface portion 303 having fine depressions and projections which is provided on the surface 302 of the RM 300 on the side near the FMD 240 is formed having many fine depressions and projections which are irregularly roughened. As shown in FIG. 2 by a partial exploded view in a circle, the rough surface portion 303 provided on the surface 302 of the RM 300 on the side near the FMD 240 is formed with a texture roughly similar to the skin of a fruit such as a pear, which will be referred to hereafter as a "knurled texture".

When the surface 302 of the RM 300 on the side near the FMD 240 is formed as the rough surface portion 303 having an irregularly roughened knurled texture, it is possible to avoid multiple interferences of light at the inside 304 of the RM 300 with respect to the laser light entering the RM 300.

Therefore, a portion of the laser light normally exits through the second surface 302 of the RM 300 toward the outside of the RM 300. With this configuration, it is possible to provide manufacturers of optical disk optical pickup devices with an optical pickup device 1 free from deficiencies such as recording deficiency.

As shown in FIG. 1, the CL 210 for converting laser light of diffuse light incident from the side of the LD 20 and LD 120 into laser light of specular light and outputting to the side of the RM 300 is positioned on an optical path between the LD 20 and the RM 300 or between the LD 120 and the RM 300. In addition, the QWP 220 which converts linearly polarized light transmitting through the CL 210 into circularly polarized light or circularly polarized light reflected from the RM 300 into linearly polarized light is positioned between the LD 20 and the RM 300 or between LD 120 and the RM 300. The QWP 220 is placed on the optical path between the CL 210 and the RM 300.

When the optical pickup device 1 is configured in this manner, it is possible to provide an optical pickup device 1 having a reduced thickness and free from deficiencies such as recording deficiency. Because the CL 210 is placed on the optical path between the LD 20 and RM 300 or between the LD 120 and RM 300, it is possible to reduce the thickness of the optical pickup device 1 compared to the thickness of, for example, the related art optical pickup device 501 (FIG. 5). In addition, because the QWP 220 (FIG. 1) is provided on the optical path between the LD 20 and RM 300 or between the LD 120 and RM 300, it is possible to reduce the thickness of the optical pickup device 1 compared to the thickness of the optical pickup device 501 (FIG. 5). Therefore, it is possible to provide manufacturers of devices such as optical disk devices, optical pickup devices, or the like with a thin optical pickup device 1 in which high quality recording process on a media 400 (FIG. 1) such as CD-R can be performed.

The optical pickup device 1 shown on FIG. 1 has a structure in which the QWP 220 is positioned on the optical path between the CL 210 and RM 300. Alternatively, it is also possible to employ a configuration in which the QWP (220) is positioned, for example, on the optical path between the OBL (230) and RM (300) depending on the design specification of the optical pickup device (1).

Next, a method of manufacturing the RM 300 in the optical pickup device 1 will be described.

Fine depressions and projections 303 are formed on the second surface 302 of the RM 300 by polishing only the second surface 302 of the RM 300 (FIGS. 1~3), emery-blasting the second surface 302, or etching the surface through a chemical process. Such a surface processing step is applied to the RM 300.

More specifically, methods of roughening the back side surface 302 of the RM 300 include a method using, for example, sandpaper having a fine mesh. Alternatively, it is also possible to roughen the surface 302 of the RM 300 through shot blasting, a surface processing technique in which fine particles of a material such as, for example, emery are blasted onto the surface using compressed air. It is also possible to roughen the surface 302 of the RM 300 through application of a chemical process on the surface 302 of the RM 300 using a specific agent.

In this manner, a surface which does not reflect light in the inside 304 of the mirror and allows transmission of light is formed only on the back side surface 302 of the RM 300. Only the second surface 302 of the RM 300 is roughened so that the back side surface 302 of the RM 300 is in the state of "obscure glass" or "ground glass". The ground glass refers to non-transparent glass. The ground glass is also referred to as obscure glass, frosted glass, or etched glass. With such a structure, light incident on the FMD 240 is dispersed so that occurrence of interference of light is inhibited and the value of current output from the FMD 240 is stabilized.

Second Preferred Embodiment

Figure 4:
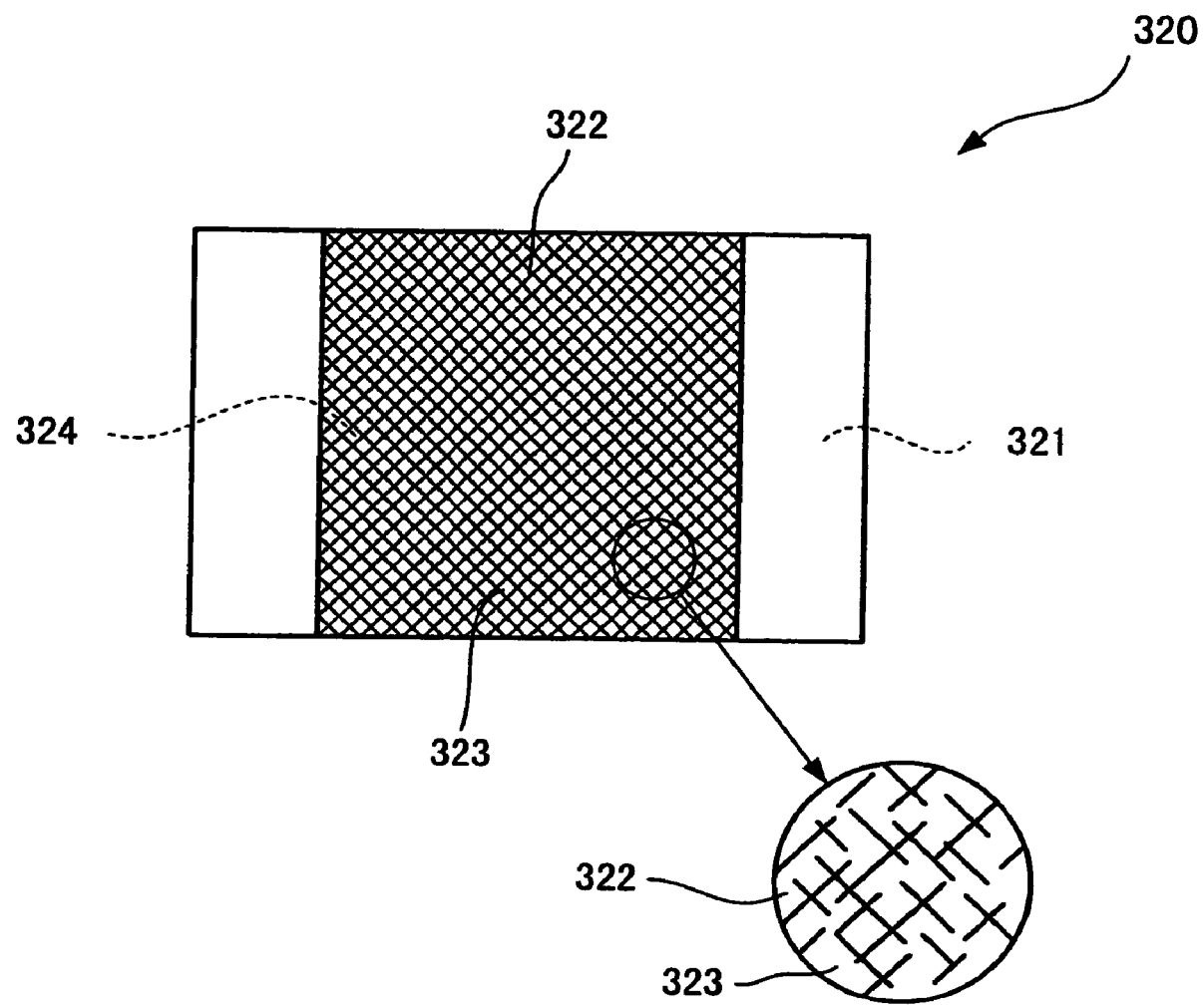
FIG. 4 is an explanatory diagram showing a reflect mirror in an optical pickup device according to a second preferred embodiment of the present invention.

FIG. 4 is an explanatory diagram showing a reflect mirror (RM) in an optical pickup device according to a second preferred embodiment of the present invention.

The optical pickup device of the second preferred embodiment is formed using an RM 320 shown in FIG. 4 in place of the RM 300 shown in FIGS. 1~3. A rough surface portion 323 of the RM 320 shown in FIG. 4 is shown for convenience and for clarifying the explanation. In reality, very fine depressions and projections 323 are formed on a surface 322 of the RM 320.

The RM 320 is formed as a glass body shaped in a sheet-like shape and comprises a first surface 321 through which a portion of the laser light enters, a second surface 322 which is formed parallel to the first surface 321 and from which a portion of the laser light transmitting from the first surface 321 through an inside 324 of the mirror exits, and a rough surface portion 323 formed on the second surface 322 and having an approximate fine mesh shape for preventing internal reflection of laser light at the inside 324 of the mirror and occurrence of interference of light.

As shown in the partial exploded view shown within the circular frame of FIG. 4, the rough surface portion 323 provided on the back side surface 322 of the RM 320 is formed in an uneven, approximate lattice pattern. Here, "lattice pattern" refers to a pattern in which a vertical stripe and a horizontal stripe are combined. The front side surface 321 of the RM 320 is formed as a coated smooth surface 321.

Because the manufacturing method of the RM 320 of the optical pickup device according to the second preferred embodiment is similar to that of the RM 300 in the optical pickup device 1, detailed description of the manufacturing method will not be repeated.

An optical disk device (not shown) having the optical pickup device 1 (FIG. 1) can be equipped in, for example, computers (not shown) such as a notebook type personal computer (PC), laptop type PC, and desktop type PC; audio devices (not shown) such as a CD player; and audio-visual devices (not shown) such as a DVD player or the like.

The desktop type computer is a computer which can be used on a desk and cannot easily be carried. In contrast to the desktop type computers, because a notebook or laptop type PC requires reduction in weight and size, the notebook type or laptop type PC has a disk device to which a slim type drive is equipped. The notebook or laptop type PC has a structure different from that of the desktop type PC. In the notebook type PC, the display and the main body of the PC are incorporated and the thickness can be reduced by folding the display with respect to the main body of PC. The size of the notebook type PC is approximately A4 size or smaller when the notebook type PC is seen from the above and the notebook type PC may also be referred to as a book type PC. In the notebook or laptop type PC, it is important that the PC is compact and can be easily carried.

An optical disk device (not shown) having the optical pickup device 1 can be equipped in an optical disk device of a thin computer such as the notebook or laptop type PC which can be easily carried. More specifically, the optical pickup device 1 is equipped in an optical disk device of a notebook type PC.

With such a configuration, it is possible to form a thin notebook type PC in which occurrence of data recording deficiency or the like in the optical disk device is inhibited. Therefore, it is possible, for example, for manufacturers of notebook type PCs to provide users of the notebook type PC, with a thinner notebook type PC in which the data recording process in the optical disk device can be executed with superior quality.

The optical pickup device according to the present invention is not limited to the examples shown in the drawings. For example, it is also possible to employ a configuration in which the QWP (220) is placed on the optical path between the OBL (230) and the RM (300). In addition, it is also possible to apply the present invention to an optical pickup device (1) in which an optical path of an HD-DVD-based structure is provided or to which an optical path of Blu-ray-based structure is added. These and other various modifications can be made within the scope of the present invention.

What is claimed is:

1. An optical pickup device comprising:
a light emitting element which emits laser light;
a photodetector which monitors a state of the laser light emitted from the light emitting element and applies a feedback to a control of the light emitting element; and
a reflect mirror which allows a portion of the laser light emitted from the light emitting element to be irradiated onto the photodetector, wherein
a rough surface portion for preventing an erroneous operation of the photodetector due to internal reflection of light within the reflect mirror is provided on a surface of the reflect mirror.

2. The optical pickup device according to claim 1, wherein the reflect mirror is formed in an approximate plate shape, and
the rough surface portion of the reflect mirror is provided on a side near the photodetector.

3. The optical pickup device according to claim 1, wherein the rough surface portion is a surface which is irregularly roughened.

4. The optical pickup device according to claim 2, wherein the rough surface portion is a surface which is irregularly roughened.

5. The optical pickup device according to claim 1, wherein a collimator lens which converts the laser light entering from the side near the light emitting element to specular light and outputs to a side near the reflect mirror is provided on an optical path between the light emitting element and the reflect mirror.

6. The optical pickup device according to claim 2, wherein a collimator lens which converts the laser light entering from the side near the light emitting element to specular light and outputs to a side near the reflect mirror is provided on an optical path between the light emitting element and the reflect mirror.

7. The optical pickup device according to claim 3, wherein a collimator lens which converts the laser light entering from the side near the light emitting element to specular light and outputs to a side near the reflect mirror is provided on an optical path between the light emitting element and the reflect mirror.

8. The optical pickup device according to claim 1, wherein the optical pickup device is provided in a transportable computer.

* * * * *